United States Patent [19]
Mercuri et al.

[11] Patent Number: 6,074,585
[45] Date of Patent: *Jun. 13, 2000

[54] FLEXIBLE GRAPHITE COMPOSITE

[75] Inventors: Robert Angelo Mercuri, Seven Hills; Joseph Paul Capp, Strongsville; Jeffrey John Gough, Olmstead Township, all of Ohio

[73] Assignee: UCAR Carbon Technology Corporation, Danbury, Conn.

[*] Notice: This patent is subject to a terminal disclaimer.

[21] Appl. No.: 09/136,323

[22] Filed: Aug. 19, 1998

Related U.S. Application Data

[62] Division of application No. 08/833,136, Apr. 4, 1997.

[51] Int. Cl.[7] .................................................. C04B 35/52

[52] U.S. Cl. ........................ 264/42; 264/80; 264/105; 264/122; 264/321; 423/448; 423/460

[58] Field of Search ............................. 264/42, 80, 105, 264/122, 321; 423/448, 460

[56] References Cited

U.S. PATENT DOCUMENTS

| | | | |
|---|---|---|---|
| 4,954,193 | 9/1990 | Murakami et al. | 264/296 |
| 5,846,459 | 12/1998 | Mercuri | 264/42 |
| 5,902,762 | 5/1999 | Mercuri et al. | 501/99 |

*Primary Examiner*—Paul Marcantoni
*Attorney, Agent, or Firm*—Frederick J. McCarthy

[57] ABSTRACT

Flexible graphite sheet having embedded ceramic fibers extending from its surfaces into the sheet to increase the permeability of the sheet to resin.

2 Claims, 4 Drawing Sheets

FLEXIBLE GRAPHITE COMPOSITE

This is a divisional application of Ser. No. 08/833,136, filed Apr. 4, 1997.

FIELD OF THE INVENTION

The present invention relates to a composite of flexible graphite and needle-shaped ceramic particles which can be used in the making of gaskets.

BACKGROUND OF THE INVENTION

The term "flexible graphite" as used herein represents the exfoliated reaction product of rapidly heated natural graphite particles which have been treated with an agent that intercalates into the crystal-structure of the graphite to expand the intercalated particles at least 80 or more times in the direction perpendicular to the carbon layers in the crystal structure. Flexible graphite and the making thereof is described in U.S. Pat. No. 3,404,061 Shane et al. Expanded, i.e. exfoliated graphite may be compressed into thin sheets (hereinafter referred as flexible graphite "foil") with a density approaching theoretical density, although a density of about 50 to 85 lbs./ft.$^3$ is suitable for most applications, including compression into shapes suitable as seal rings in engine exhaust and other applications.

A common method for making expandable graphite particles, described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. A preferred intercalating agent is a solution of a mixture of sulfuric acid, or sulfuric acid and phosphoric acid, and an oxidizing agent, i.e. nitric acid, perchloric-acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. After the flakes are intercalated excess solution is drained from the flakes and after washing with water, the intercalated graphite flakes are dried and are expandable upon exposure to a flame for only a few seconds. The thus treated particles of graphite are hereafter referred to as "particles of intercalated graphite". Upon exposure to high temperature, the particles of intercalated graphite expand in dimension as much as 80 to 1000 or more times its original volume in an accordion-like fashion in the c-direction, i.e. in the direction perpendicular to the crystalline planes of the constituent graphite particles. The exfoliated graphite particles are vermiform in appearance, and are therefore commonly referred to as worms. The worms may be compressed together into flexible sheets which, unlike the original graphite flakes, can be formed and cut into various shapes.

Flexible graphite foil is coherent, with good handling strength, and flexible graphite foil can be wound into rolls and can also be wrapped around metal fixtures such as mandrels, possesses desirable heat transfer properties and is, accordingly, particularly useful for high temperature applications such as engine exhaust seal ring applications. It has been proposed to increase the sealability of flexible graphite sheet or foil by impregnating the same with resin. However, the surface layers of flexible graphite sheet or foil, due to the alignment of exfoliated graphite particles and the constituent layers of atoms parallel to the surface of the flexible sheet or foil, resist resin impregnation when the sheet or foil is immersed in liquid resin. However, due to the well known anisotropy of flexible graphite, resin will flow readily within the flexible graphite sheet in directions parallel to the opposed parallel planar surfaces of the sheet or foil and the planes of the constituent graphite particles of the sheet, i.e. transverse to the "c axis" direction of the graphite particles if penetration into the flexible graphite sheet can first be achieved.

Accordingly, it is an object of the present invention to provide a flexible graphite sheet, or foil, of increased permeability to enable increased resin impregnation.

SUMMARY OF THE INVENTION

Figure 1:
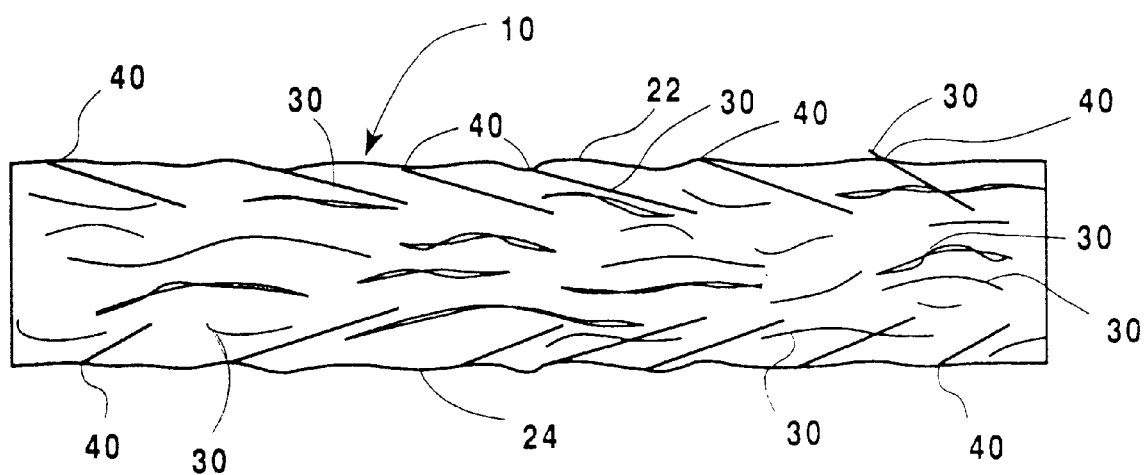
FIG. 1 shows, in an enlarged cross-section sketch of a sheet of flexible graphite (original thickness of 0.01 inch) containing ceramic fibers in accordance with the present invention.

The present invention relates to a composite of a sheet of flexible graphite having opposed parallel, planar outer surfaces and needle-shaped ceramic fiber particles which are embedded in the flexible sheet and which extend from interior the flexible sheet to at least one of the planar outer surfaces of the flexible graphite sheet.

DETAILED DESCRIPTION

In the practice of a particular embodiment of the present invention, intercalated natural graphite flakes are mixed and blended with from about 1.5 to 30% by weight of needle-shaped ceramic fiber particles having a length of 0.15 to 1.5 millimeters. The width of the particles should be from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The mixture of intercalated natural graphite flake and needle-shaped ceramic fiber particles, in which the graphite flake and ceramic fiber particles are in general alignment, is exposed to a flame at a temperature up to 2500° F. to exfoliate, i.e. expand the intercalated graphite flake into expanded graphite particles from 80 to 1000 times the volume of the unexpanded intercalated natural graphite flake which surround and entrap the needle-shaped ceramic fiber particles. Due to the expansion, the ceramic fiber particles are no longer in substantial alignment with the graphite particles but are randomly positioned in the mixture of exfoliated graphite and ceramic fiber. The mixture of exfoliated graphite particles and randomly oriented needle-shaped ceramic fiber particles is roll-pressed into sheet or foil typically 0.1 to 3.5 mm thick. The resultant sheet, or foil, is characterized by having needle-shaped particles extending from interior of the flexible graphite sheet to and through at least one of the opposed planar surfaces of the flexible graphite sheet. Since the needle-shaped ceramic fiber particles are non-reactive and non-adhering to the graphite in the flexible sheet, a plurality of annular channels surrounding the respective needle-shaped particles is provided in the flexible graphite sheet extending from the opposed surfaces of the sheet into the body of the sheet. These channels, with the flexible graphite sheet immersed in liquid resin, receive the resin which then infiltrates the flexible graphite sheet in the more permeable direction parallel to the planar surfaces of the flexible graphite sheet and the pressed, exfoliated graphite particles forming the sheet, assisted by channels formed by needle shaped ceramic fiber particles embedded between, but not penetrating the planar parallel surfaces of the flexible graphite sheet. The ceramic fiber particles remain stable during all steps of the processing treatment so that the channels are not blocked by melted fiber or fiber decomposition products. After curing of the resin, within the graphite sheet the sealability of the flexible graphite sheet is enhanced for gaskets formed from said sheet. In a preferred embodiment the resin-containing sheet is calendered by roll pressing between pressure rolls.

FIG. 1 is a drawing sketch based on microscope observations of 0.01 inch thick sheets of flexible graphite which shows a flexible graphite sheet 10, in cross-section, with parallel opposed planar surfaces 22, 24. Embedded ceramic fiber particles are shown at 30. Penetration of sheet 10 by ceramic fibers 30 is illustrated at 40.

EXAMPLE I

Natural graphite flake, sized 80% by weight held on 50 mesh was treated in a mixture of 90 wt. % sulfuric acid and 10 wt. % nitric acid. The thus treated intercalated graphite flake was water washed and dried to about 1% by weight water. One (1) pound of this intercalated flake was mixed with 0.15 pounds of needle-shaped ceramic fiber of commercially available calcium metasilicate sized mostly with a 15 to 25% aspect ratio. The mixture of intercalated graphite and calcium metasilicate fiber was introduced into a furnace of 2500° F. to obtain rapid expansion of the intercalated graphite flake into vermicular worm-shaped particles having a volume of about 325 times that of the unexpanded intercalated flake. The expanded worm-shaped particles surrounded the admixed calcium metasilicate fibers and the mixture was rolled into a flexible graphite sheet 0.01 inch thick and 24 inches wide in which admixed calcium metasilicate fibers extended from a surface of the sheet into the body of the sheet which contained about 12% by weight of the calcium metasilicate fiber.

Figure 2:
FIGS. 2 through 6 are electron microscope views (original magnification 100X) at increasing electron beam intensity voltages (2.5 KV to 40 KV) of a portion of a planar surface of a flexible graphite sheet containing ceramic fibers in accordance with the present invention.
Figure 3:
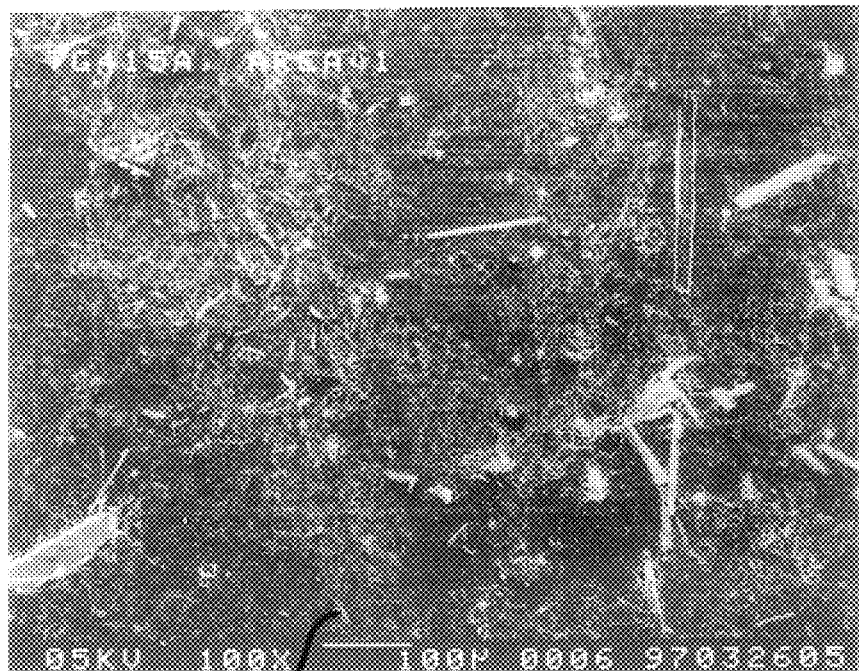
Figure 4:
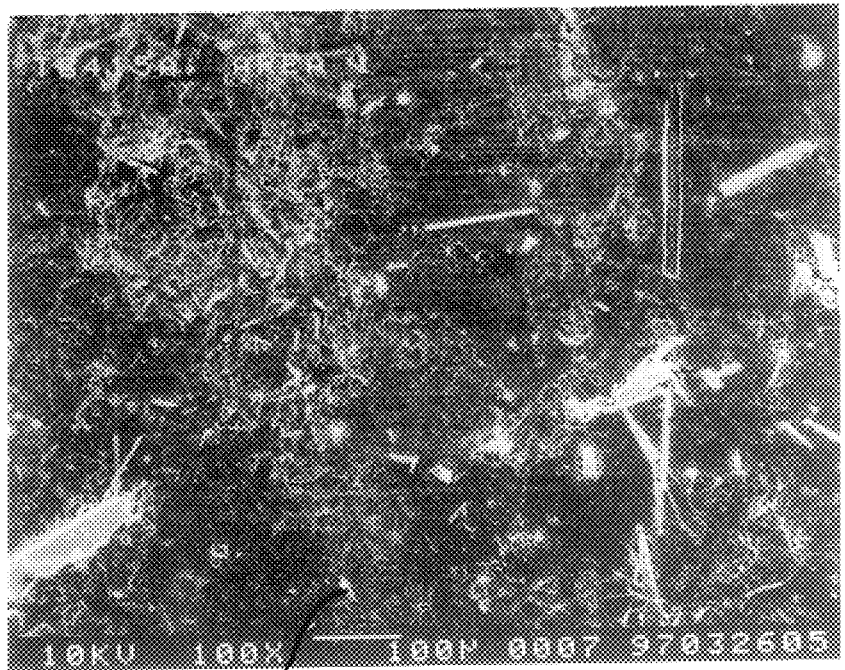
Figure 5:
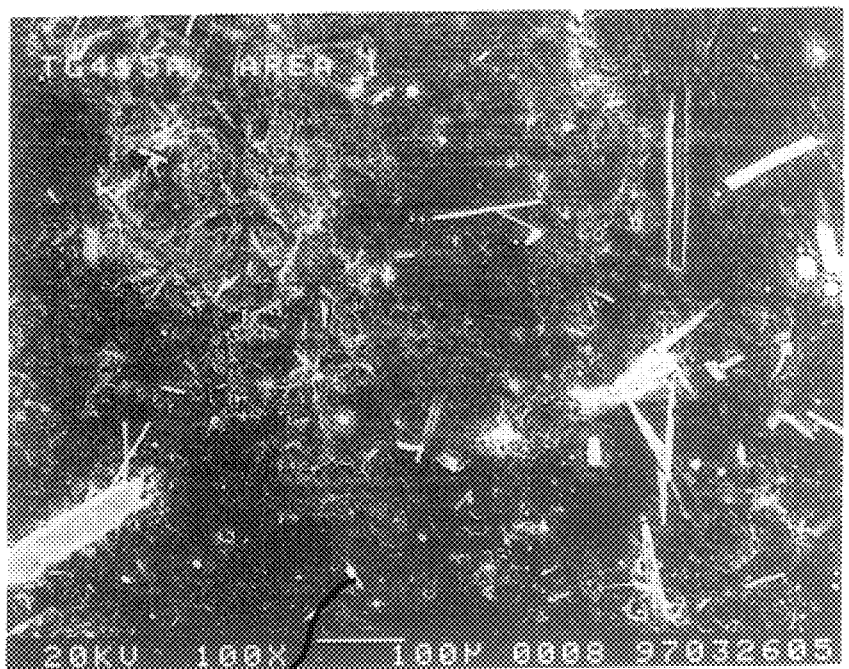
Figure 6:
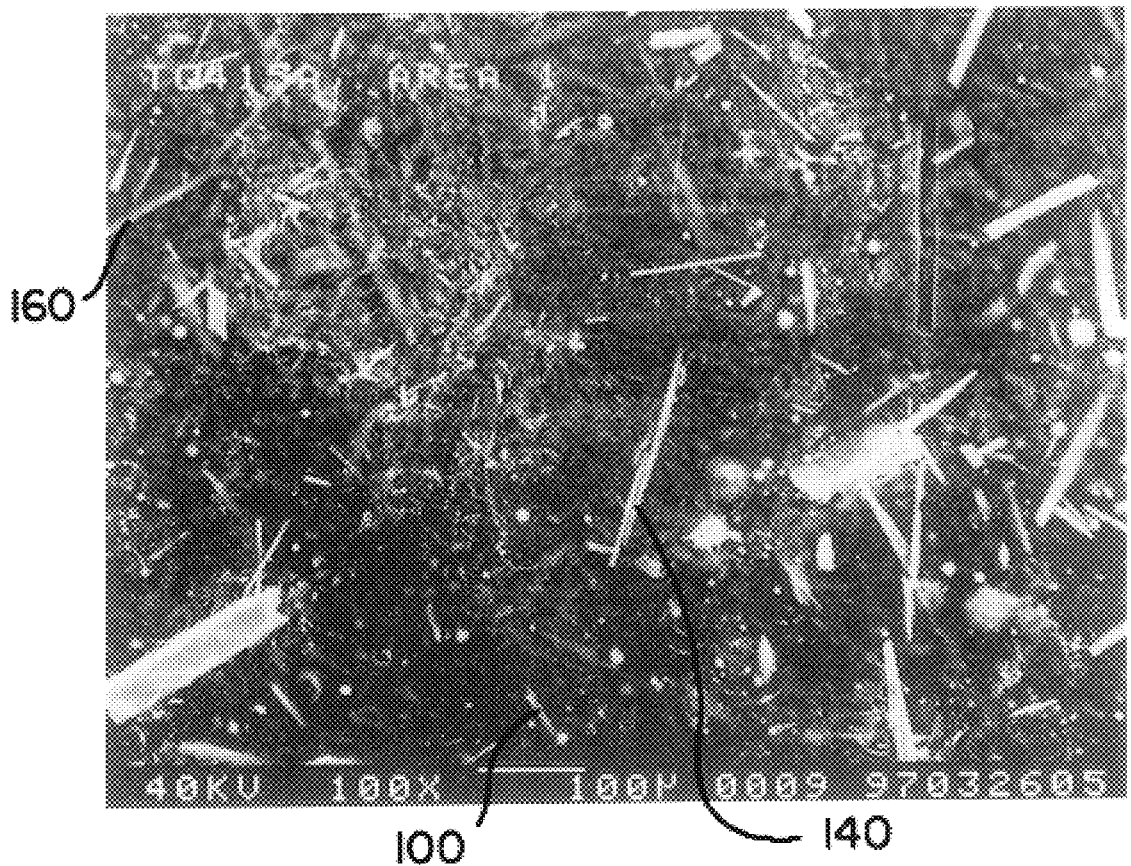

The electron microscope view of FIG. 2 (100X- see 100 micron scale) shows the upper portion of a ceramic fiber 100 which penetrates a planar surface 22 of a flexible graphite sheet. FIGS. 3 to 6, at increasing voltages, look "deeper" into the flexible graphite sheet and show the penetration of ceramic fiber 100 into the flexible graphite sheet. Ceramic fibers embedded in the flexible graphite sheet below surface 72 are shown at 140, 160.

EXAMPLE II

A sample of the sheet of Example I, 8 inches wide was immersed in and pulled through a solution of resin 10% phenolic resin with acetone diluent at a rate of 10 feet per minute. After immersion and drying, the sample showed an increase in weight of 18.7%.

The sample was further treated by heating to 235° C. to stabilize the resin and the sheet was calendered between pressure rolls to a density of 1.5 gms/cc. The calendered sheet was soaked in oil and water and was unaffected. A control sheet without any added ceramic fiber or resin additives exposed to the same test conditions increased about 35% in weight and 8% in thickness.

Sample sheets with 5%, 15% and 25% by weight of calcium metasilicate fibers as additive were pulled through resin at a rate of 10 feet per minute and were saturated with resin at about 17–19% by weight of resin. A control sample without any added ceramic fiber retained only 5% by weight of resin at the same pull rate of 10 feet per minute.

What is claimed is:

1. Method for making a flexible graphite sheet having opposite planar outer surfaces which is permeable to liquid resin solution which comprises:

(i) treating natural graphite flake with an intercalating solution to obtain heat expandable, intercalated graphite flake particles;

(ii) mixing from about 1.5 to 30% by weight of needle-shaped ceramic fiber particles with said intercalated graphite flake particles to provide a blended mixture, said needle-shaped ceramic fiber particles being non-reactive with flexible graphite and stable at temperatures up to 2500° F.;

(iii) passing said blended mixture of intercalated natural graphite flake particles and needle-shaped ceramic fiber particles through a flame to cause rapid exfoliation of said intercalated natural graphite particles and provide a mixture of said needle-shaped ceramic fiber particles with exfoliated graphite particles; and (iv) passing said mixture of needle-shaped particles and exfoliated graphite particles between pressure rolls to form a compressed sheet of flexible graphite having embedded therein a dispersion of a plurality of needle-shaped particles which extend from at least one of said planar outer surfaces into the sheet.

2. Method in accordance with claim 1 wherein (i) the sheet of step (iv) is immersed in resin which penetrates the sheet; (ii) stabilizing the resin by heating; and (iii) calendering the resin containing sheet by passing the resin containing sheet between pressure rolls.

* * * * *

UNITED STATES PATENT AND TRADEMARK OFFICE
CERTIFICATE OF CORRECTION

PATENT NO.    : 6,074,585
DATED         : June 13, 2000
INVENTOR(S)   : R.A. Mercuri et al.

It is certified that error appears in the above-identified patent and that said Letters Patent is hereby corrected as shown below:

Column 1,
Line 23, "50 to 85 lbs./ft.$^3$" should be -- 10 to 85 lbs./ft.$^3$ --.

Signed and Sealed this

Thirty-first Day of December, 2002

JAMES E. ROGAN
*Director of the United States Patent and Trademark Office*